P. C. JEPPESEN.
CYCLE.
APPLICATION FILED SEPT. 19, 1908.

928,765.

Patented July 20, 1909.

Witnesses:
C. H. Crawford
L. Waldman

Inventor:-
Peter Chrisjan Jeppesen
B. Singer
Attorney

UNITED STATES PATENT OFFICE.

PETER CHRISJAN JEPPESEN, OF COPENHAGEN, DENMARK.

CYCLE.

No. 928,765. Specification of Letters Patent. Patented July 20, 1909.

Application filed September 19, 1908. Serial No. 453,854.

*To all whom it may concern:*

Be it known that I, PETER CHRISJAN JEPPESEN, manufacturer, subject of Denmark, residing at No. 36 Oesterbrogade, Copenhagen, Denmark, have invented new and useful Improvements in and Relating to the Construction of Cycles and the Like, of which the following is a specification.

This invention relates to a safety device for cycles and the like and consists in the branches of the front fork being connected together by means of a fitting which in its turn is connected to the handle bar or to the steering tube, by means of a rod carried through the tube of the front frame. The fitting in question, as well as the rod in question, are made of soft and tough iron or the like, and are intended to keep together the parts of the front fork in the event of the same breaking at the crown. The rider is then able to jump off from the cycle without falling, as the cycle cannot collapse suddenly. This device is, therefore, intended to prevent accidents due to a breakage of the front fork or of the handle bar.

Two constructions according to this invention are illustrated by way of example in the accompanying drawings.

Figure 1:
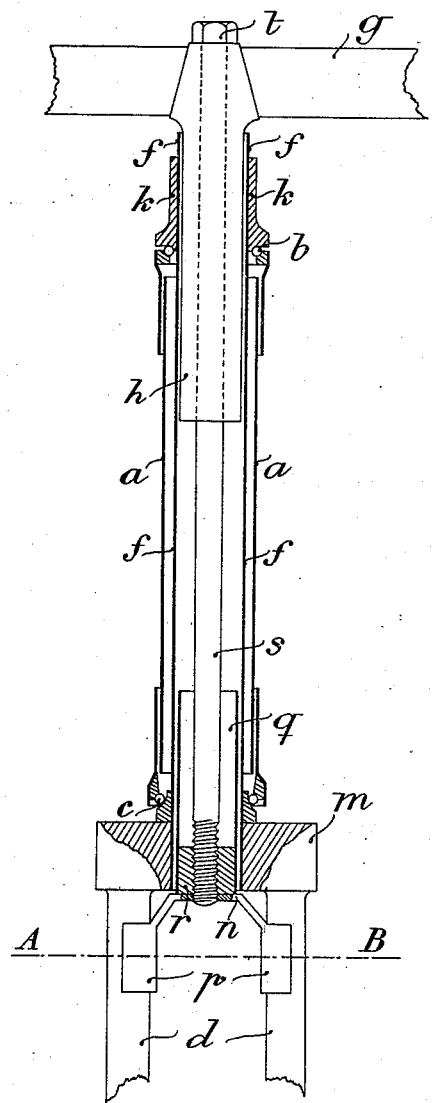
Figure 2:
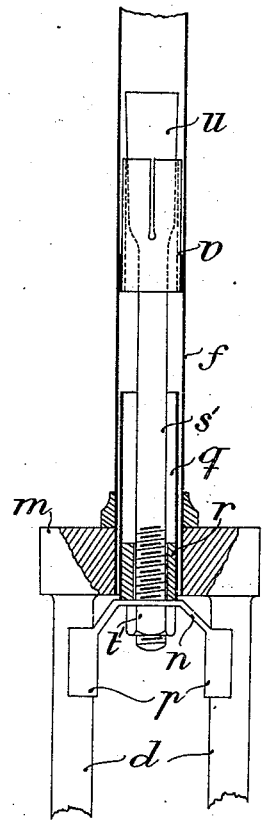
Figure 3:
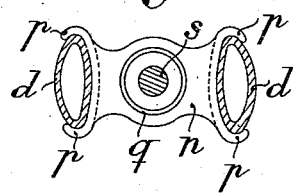

Figures 1 and 2 show the device for connecting the above mentioned fitting with the handle bar or with the steering tube, partly in section. Fig. 3 is a section on line A—B of Fig. 1.

In the construction shown in Figs. 1 and 3, $a$ is the outside frame tube of the front frame, in which at the top and at the bottom are provided ball bearings $b$ and $c$, for the tube $f$ of the front fork $d$. The handle bar $g$ is provided with a short tube $h$ introduced into the tube $f$ and capable of being locked by means of a clamping ring $k$ mounted on the portion of the tube $f$ slit at the top. At the top, namely, below the crown $m$, is mounted a plate $n$ provided with claws $p$ which surround entirely or even partly the fork branches $d$, and to the said plate is secured a tube $q$ projecting upward into the tube $f$ and fitting the latter exactly. The plate $n$ is provided in the center with a thickened portion or boss $r$ which is perforated and provided with screwthreads for a rod $s$ extending through the tubes $f$ and $h$ and the handle bar $g$, and provided with a head $t$.

When it is desired to adjust the handlebar $g$ at different height than before, the clamping ring $k$ is loosened, and the handlebar is pulled upward or pushed down, whereupon the clamping ring $k$ is again tightened. The length of the rod $s$ is adjusted to suit the height of the handlebar by screwing it by means of the head $t$ into the part of boss $r$ to a greater or less extent.

In the construction shown in Fig. 2, the fitting $n$ together with the claws $p$, instead of being connected to the handlebar, is connected to the front tube $f$. The rod $s^1$ is provided at the top with a thin cone $u$ projecting with its downward pointed end into a piece of tube $v$ slotted and mounted loosely in the tube $f$. The rod $s^1$ is provided at the bottom with screwthreads for a nut $t^1$ and prevented in a suitable manner from turning, for instance by being provided with a flattened surface and guided by means of a corresponding hole in the fitting $n$.

When the nut $t^1$ is tightened, the cone $u$ penetrates into the tube $v$ which is thus expanded and gets jammed in the front tube $f$. In that way the tube is connected to the fitting $n$ and to the claws $p$.

Having now particularly described and ascertained the nature of my said invention and in what manner the same is to be performed, I declare that what I claim is:—

1. In a safety device for cycles consisting in combination of a rod passing through the steering tube, a means for connecting said rod to the handle bar, a plate bridging the front fork, a pair of claws attached to said plate adapted to engage the front fork members, a means for adjusting said rod to elevate or depress the handle bar substantially as specified.

2. In a safety device for cycles consisting in combination of a rod passing through the steering tube, a means for securing said rod to the handle bar and to the bridge of the front fork, a plate attached beneath the bridge of the front fork, said plate being provided with a threaded opening, a claw on each end of said plate to engage a fork member and adapted to reinforce the bridge of said fork, and a means of securing said plate to the steering tube and a means of adjustment for said handle bar substantially as specified.

3. In a safety device for cycles consisting in combination of a rod in the steering tube adjustably connected, a reinforcing plate secured beneath the bridge of said fork provided with a pair of claws to engage the fork members, said plate being furthermore provided with a threaded opening to engage with said rod, a nut on the lower end of said rod and a cone on the other end in the steering tube, a short slotted tube mounted loosely in the steering tube adapted to engage telescopically with said cone, a means for adjustment of said rod relatively with said handle bar substantially as specified.

In testimony whereof I have signed my name to this specification in the presence of two subscribing witnesses.

PETER CHRISJAN JEPPESEN.

Witnesses:
F. HOFMAN-BANG,
ERNEST BOUTARD.